United States Patent
Kim et al.

(10) Patent No.: US 11,675,393 B2
(45) Date of Patent: Jun. 13, 2023

(54) DISPLAY DEVICE

(71) Applicant: Samsung Display Co., LTD., Yongin-si (KR)

(72) Inventors: Ye Jin Kim, Seoul (KR); Seul-Gi Kim, Seoul (KR); Cheol Geun An, Yongin-si (KR); Eui Yun Jang, Seoul (KR); Won Joon Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 69 days.

(21) Appl. No.: 17/123,869

(22) Filed: Dec. 16, 2020

(65) Prior Publication Data

US 2021/0208636 A1 Jul. 8, 2021

(30) Foreign Application Priority Data

Jan. 7, 2020 (KR) .................. 10-2020-0002224

(51) Int. Cl.
*G06F 1/16* (2006.01)

(52) U.S. Cl.
CPC .......... *G06F 1/1656* (2013.01); *G06F 1/1652* (2013.01); *G02F 2202/28* (2013.01)

(58) Field of Classification Search
CPC ............... G06F 1/1656; G06F 1/1652; G06F 2203/04102; G02F 2202/28; B32B 2266/0207; B32B 2266/0278; B32B 3/266; B32B 5/18; B32B 15/046; B32B 15/085; B32B 15/095; B32B 27/065; B32B 2266/0242; B32B 27/308; B32B 2457/206; B32B 7/12; B32B 15/09; B32B 27/08; B32B 27/281; B32B 27/285; B32B 27/286; B32B 27/304; B32B 27/36; B32B 27/365; G09F 9/301; C09J 11/00; C09J 133/04; C09J 2203/318; C09J 2301/312
See application file for complete search history.

(56) References Cited

U.S. PATENT DOCUMENTS

| | | | |
|---|---|---|---|
| 10,345,856 B2 * | 7/2019 | Song | G09G 3/34 |
| 2018/0053451 A1 * | 2/2018 | Han | H01L 51/5253 |
| 2018/0190936 A1 * | 7/2018 | Lee | B32B 15/04 |
| 2020/0389986 A1 * | 12/2020 | Tsuchihashi | G06F 1/1616 |
| 2021/0118337 A1 * | 4/2021 | Park | G06F 1/1643 |

(Continued)

FOREIGN PATENT DOCUMENTS

| | | | | |
|---|---|---|---|---|
| CN | 107527556 A | * | 12/2017 | G09F 9/301 |
| KR | 10-2017-0084402 | | 7/2017 | |

(Continued)

*Primary Examiner* — Rockshana D Chowdhury
(74) *Attorney, Agent, or Firm* — Kile Park Reed & Houtteman PLLC

(57) ABSTRACT

A display device according to an embodiment includes a display panel and a protection layer that is disposed on the display panel, wherein the protection layer includes: a first protection layer; a metal layer that overlaps the first protection layer and includes a hole; and an adhesive layer disposed between the first protection layer and the metal layer. The adhesive layer includes a first area disposed between the first protection layer and the metal layer, and a second area and a third area that are disposed in the hole, wherein a peeling strength of the second area and a peeling strength of the third area are different from each other.

17 Claims, 16 Drawing Sheets

(56) References Cited

U.S. PATENT DOCUMENTS

| | | | |
|---|---|---|---|
| 2021/0201712 A1* | 7/2021 | Chun | B32B 27/38 |
| 2021/0365132 A1* | 11/2021 | Jung | G06F 1/1637 |
| 2021/0405781 A1* | 12/2021 | Li | H01L 27/323 |

FOREIGN PATENT DOCUMENTS

| | | | | |
|---|---|---|---|---|
| KR | 10-2018-0036904 | | 4/2018 | |
| KR | 10-2019-0069075 | | 6/2019 | |
| KR | 10-2019-0081264 | | 7/2019 | |
| KR | 10-2019-0081335 | | 7/2019 | |
| WO | WO-2016098677 A1 * | 6/2016 | | B32B 17/00 |

* cited by examiner

DISPLAY DEVICE

CROSS-REFERENCE TO RELATED APPLICATION(S)

This application claims priority to and benefits of Korean Patent Application No. 10-2020-0002224 under 35 U.S.C. § 119, filed on Jan. 7, 2020 in the Korean Intellectual Property Office, the entire contents of which are incorporated herein by reference.

BACKGROUND

1. Technical Field

The disclosure relates to a display device.

2. Description of the Related Art

Recently, electronic devices that can be bent or folded have been actively researched and developed. Flexible electronic devices may include an electronic panel such as a flexible display panel or a flexible touch panel, and various external side members. The external side members respectively have different functions and are disposed on at least one side of the electronic device.

The external side members are twisted, bent, or folded together with the flexible electronic device. Such external side members need to have a relatively flexible characteristic so as to be twisted, bent, or folded.

The above information disclosed in this Background section is only for enhancement of understanding of the field of the invention and therefore it may contain information that does not form the prior art that is already known to a person of ordinary skill in the art.

SUMMARY

Embodiments are provided for a display device having improved reliability and flexibility.

A display device according to an embodiment may include a display panel and a protection layer disposed on the display panel. The protection layer may include a first protection layer, a metal layer that overlaps the first protection layer and includes a hole, and an adhesive layer disposed between the first protection layer and the metal layer. The adhesive layer may include a first area disposed between the first protection layer and the metal layer, and a second area and a third area disposed in the hole. A peeling strength of the second area and a peeling strength of the third area may be different from each other.

The peeling strength of the second area may be greater than the peeling strength of the third area.

The peeling strength of the third area may be about zero.

The display device may further include a second protection layer disposed between the first protection layer and the metal layer.

The adhesive layer may include an acryl-based adhesive material.

The acryl-based adhesive material may include at least one of 2-ethylhexyl acrylate (2-EHA), 2-hydroxyethyl acrylate (2-HEA), isobornyl acrylate (IBoA), isobornyl methacrylate, isooctyl acrylate (IOA), n-octyl acrylate, n-butyl acrylate (n-BA), vinyl acetate (VAC), cyclohexyl acrylate (CHA), tetrahydrofurfuryl acrylate (THFA), 4-acryloylmorpholine, lauryl acrylate, and urethane acrylate.

The adhesive layer may have a modulus of about 0.001 MPa to about 0.250 MPa at 25° C.

The first area and the second area may independently include at least one of poly(isobornyl acrylate) (PiBoA) and poly(tert-butyl acrylate) (PtBA).

The first area and second area may independently further include a photoacid generator.

The photoacid generator may include at least one of N-trifluoromethylsulfonyloxy-1,8-naphthalimide and bis(cyclohexyl sulfonyl)diazomethane.

The third area may include polyacrylic acid (PAA).

The third area may further include at least one of camphene and isobutene.

A display device according to an embodiment may include a display panel and a protection layer disposed on the display panel. The protection layer may include a first protection layer, a second protection layer disposed on the first protection layer, a metal layer disposed on the second protection layer and includes holes, and an adhesive layer disposed between the second protection layer and the metal layer. The adhesive layer may include a first area disposed between the first protection layer and the metal layer, and a second area and a third area that are disposed in the holes. A peeling strength of the second area and a peeling strength of the third area may be different from each other, and a bending axis of the display device may overlap the holes.

The peeling strength of the second area may be greater than the peeling strength of the third area.

The adhesive layer may include an acryl-based adhesive material.

The acryl-based adhesive material may include at least one of 2-ethylhexyl acrylate (2-EHA), 2-hydroxyethyl acrylate (2-HEA), isobornyl acrylate (IBoA), isobornyl methacrylate, isooctyl acrylate (IOA), n-octyl acrylate, n-butyl acrylate (n-BA), vinyl acetate (VAC), cyclohexyl acrylate (CHA), tetrahydrofurfuryl acrylate (THFA), 4-acryloylmorpholine, lauryl acrylate, and urethane acrylate.

The adhesive layer may have a modulus of about 0.001 MPa to about 0.250 MPa at 25° C.

The first area and the second area may independently include at least one of poly(isobornyl acrylate) (PiBoA) and poly(tert-butyl acrylate) (PtBA).

The first area and the second area may independently further include at least one of N-trifluoromethylsulfonyloxy-1,8-naphthalimide and bis(cyclohexyl sulfonyl)diazomethane.

The third area may include polyacrylic acid (PAA) and at least one of camphene and isobutene.

DETAILED DESCRIPTION OF THE EMBODIMENTS

Figure 1:
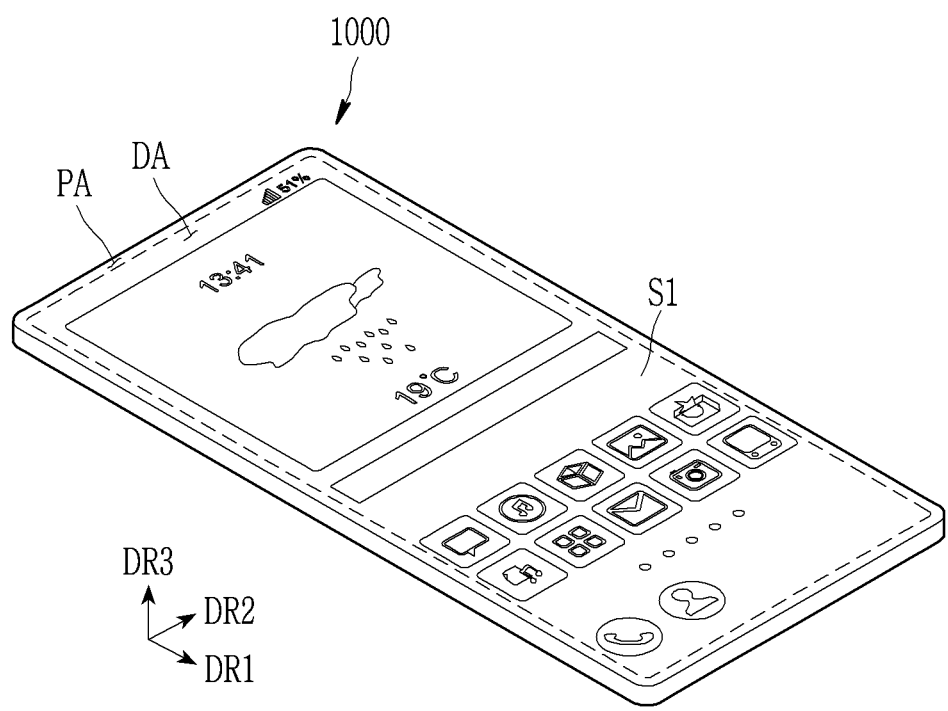
FIG. 1 is a perspective view of a display device according to an embodiment.

The invention will be described more fully hereinafter with reference to the accompanying drawings, in which embodiments of the invention are shown. As those skilled in the art would realize, the described embodiments may be modified in various different ways, all without departing from the spirit or scope of the invention.

The drawings and description are to be regarded as illustrative in nature and not restrictive. Like reference numerals designate like elements throughout the specification.

Further, in the drawings, size and thickness of each element are arbitrarily represented for better understanding and ease of description, but the invention is not limited thereto. In the drawings, the thickness of layers, films, panels, regions, etc., are exaggerated for clarity. In the drawings, the thickness of some layers and regions is exaggerated for better understanding and ease of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

As used herein, the term "and/or" includes any and all combinations of one or more of the associated listed items for the purpose of its meaning and interpretation. Throughout the disclosure, the expression "at least one of a, b or c" indicates only a, only b, only c, both a and b, both a and c, both b and c, all of a, b, and c, or variations thereof. For example, "A and/or B" may be understood to mean A, B, or A and B. The terms "and" and "or" may be used in the conjunctive or disjunctive sense and may be understood to be equivalent to "and/or". Throughout the disclosure, the expression "at least one of a, b or c" indicates only a, only b, only c, both a and b, both a and c, both b and c, all of a, b, and c, or variations thereof.

The phrase "at least one of" is intended to include the meaning of "at least one selected from the group consisting of" for the purpose of its meaning and interpretation. For example, "at least one of A and B" may be understood to mean A, B, or A and B. When preceding a list of elements, the term, "at least one of," modifies the entire list of elements and does not modify the individual elements of the list.

Unless explicitly described to the contrary, the word "comprise" and variations such as "comprises" or "comprising" will be understood to imply the inclusion of stated elements but not the exclusion of any other elements.

Further, in this specification, the phrase "on a plane" means viewing a target portion from the top, and the phrase "on a cross-section" means viewing a cross-section formed by vertically cutting a target portion from the side.

Figure 2A:
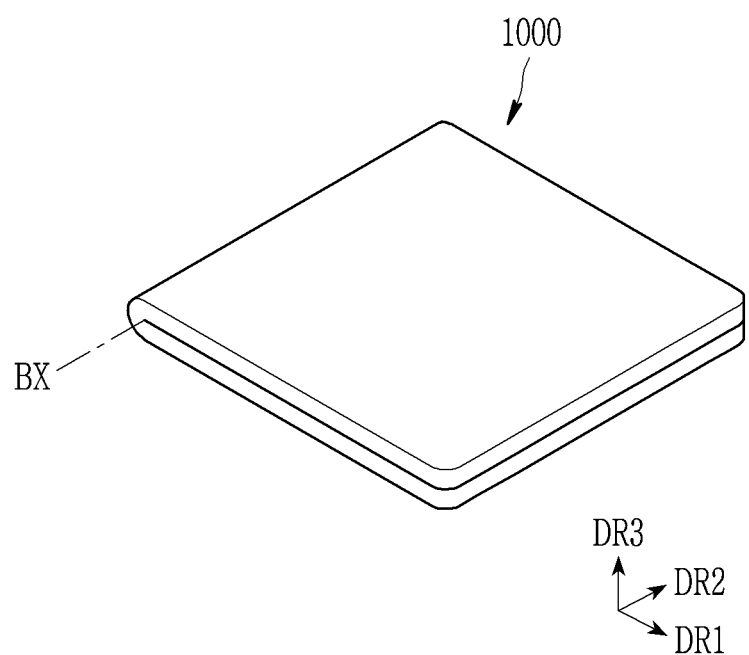
FIGS. 2A, 2B, 2C, 2D, 2E, 2F, and 2G are perspective views that respectively illustrate the display device shown in FIG. 1 when it is folded or rolled.

Hereinafter, a display device according to an embodiment will be described with reference to FIG. 1 to FIG. 2G. FIG. 1 is a perspective view of a display device according to an embodiment, and FIGS. 2A, 2B, 2C, 2D, 2E, 2F, and 2G are perspective views that respectively illustrate the display device shown in FIG. 1 when it is folded or rolled.

Referring to FIG. 1, a display device 1000 according to an embodiment may include a display area DA where an image is disposed on a first side S1 thereof, and a peripheral area PA that is adjacent to (or surrounds) the display area DA. The peripheral area PA may be an area where an image is not displayed, and the shape of the display area DA and the shape of the peripheral area PA may be correspondingly changed. Depending on the embodiments, the peripheral area PA may be substantially omitted. In the specification, icons of applications and a clock window are illustrated as an example in FIG. 1, and the display area DA may be formed in the shape of a quadrangle, but embodiments are not limited thereto.

The display device 1000 according to the embodiment may be a foldable display device, a rollable display device, a bendable display device, or a stretchable display device. The display device 1000 according to the embodiment may be used for large electronic devices such as televisions and monitors, and small and medium electronic devices such as portable phones, tablets, car navigation systems, game consoles, smart watches, and the like.

Hereinafter, referring to FIG. 1 and FIG. 2A, the display device 1000 according to the embodiment may be in-folded with reference to a bending axis BX that is parallel with a second direction DR2.

As the display device 1000 according to the embodiment is in-folded with respect to the bending axis BX, the first side S1 of the display device 1000 is bent with respect to the bending axis BX that is parallel with the second direction DR2 such that the first side S1 of the display device 1000 is folded to face itself with reference to the bending axis BX and a rear side that is opposite the first side S1 may be exposed to the outside.

Figure 2B:
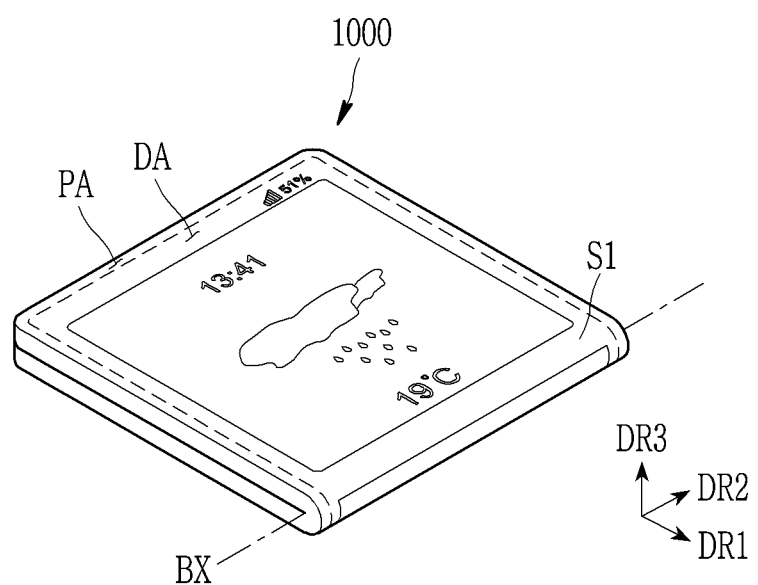

Referring to FIG. 2B, the display device 1000 according to the embodiment may be out-folded with reference to the bending axis BX that is parallel with the second direction DR2. As the display device 1000 according to the embodiment is out-folded with respect to the bending axis BX that is parallel with the second direction DR2, the first side S1 of the display device 1000 is exposed to the outside and the rear side that opposes the first side S1 is folded with respect to the bending axis BX that is parallel with the second direction DR2 such that the rear side of the display device 1000 is folded and thus opposite sides of the rear side determined with reference to the bending axis BX may face each other.

Figure 2C:
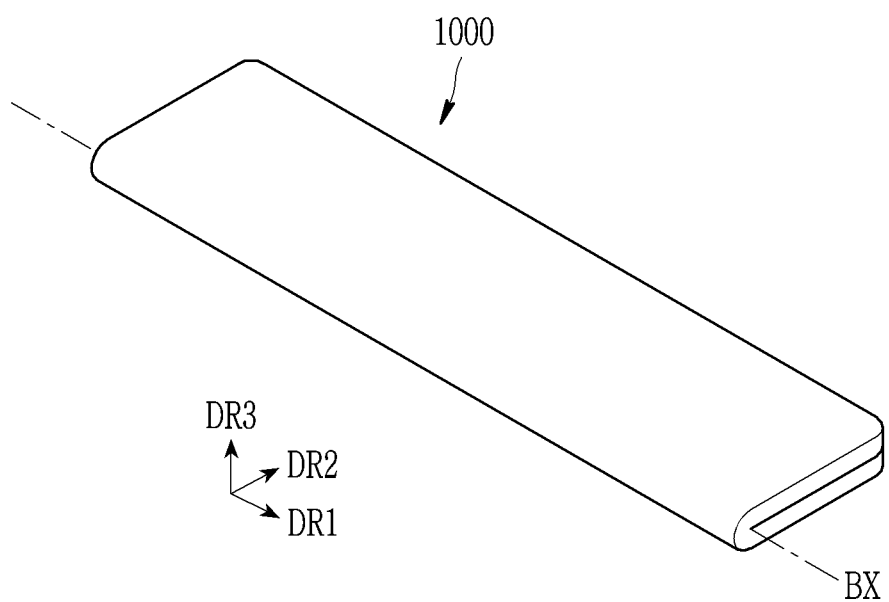

Referring to FIG. 1 and FIG. 2C, the display device 1000 according to the embodiment may be in-folded with respect to a bending axis BX that is parallel with a first direction DR1. As the display device 1000 according to the embodiment is in-folded with respect to the bending axis BX parallel to the first direction DR1, the first side S1 of the display device 1000 is folded to face itself, and the rear side opposing the first side S1 may be exposed to the outside.

Figure 2D:
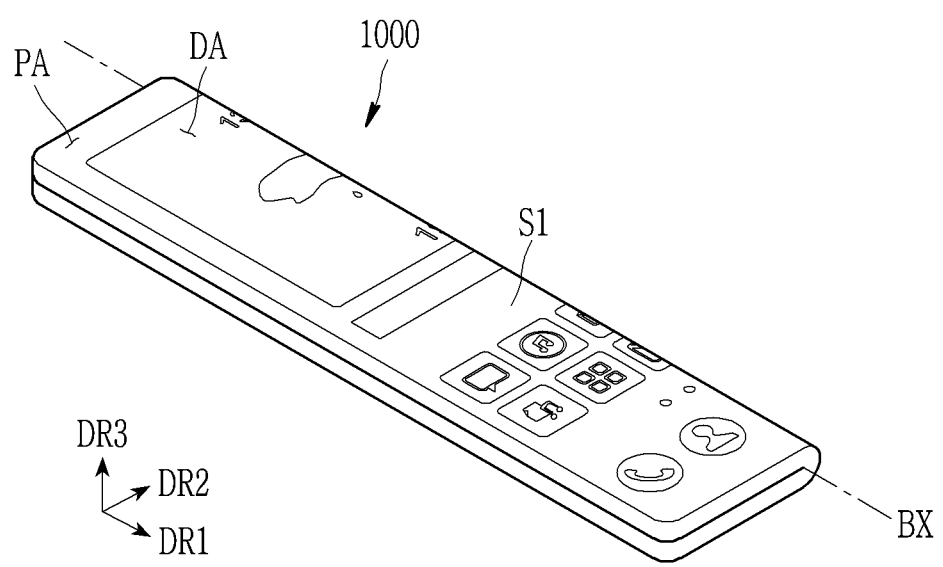

Referring to FIG. 2D, the display device 1000 according to the embodiment may be out-folded with respect to the bending axis BX that is parallel with the first direction DR1. As the display device 1000 according to the embodiment is out-folded with respect to the bending axis BX that is parallel with the first direction DR1, the first side S1 of the display device 1000 is exposed to the outside and the rear side that opposes the first side S1 is folded with respect to the bending axis BX that is parallel with the first direction DR1 such that the rear side of the display device 1000 is folded and thus the resultant two halves of the rear side determined with reference to the bending axis BX may face each other.

Figure 2E:
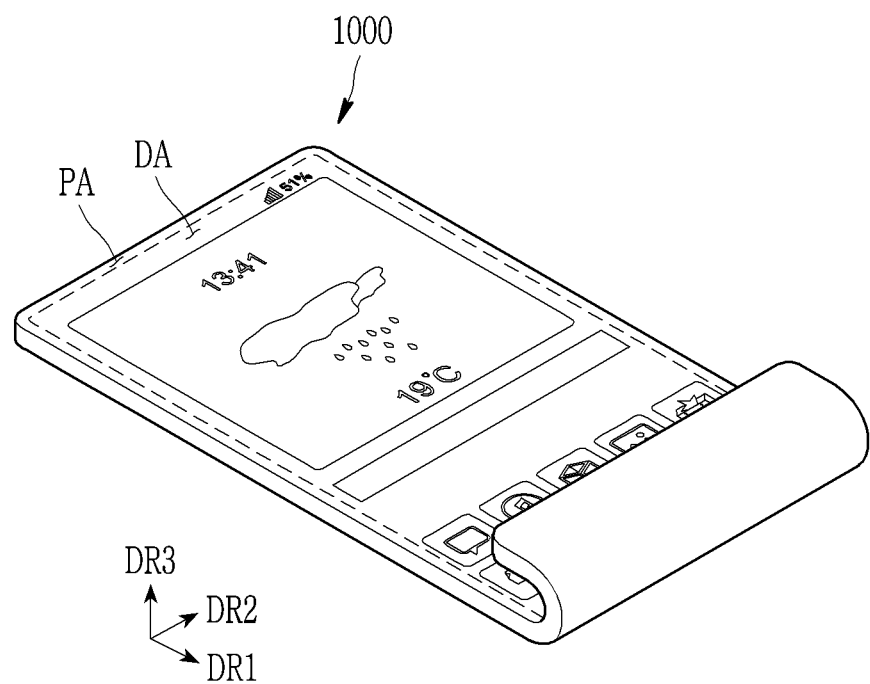
Figure 2F:
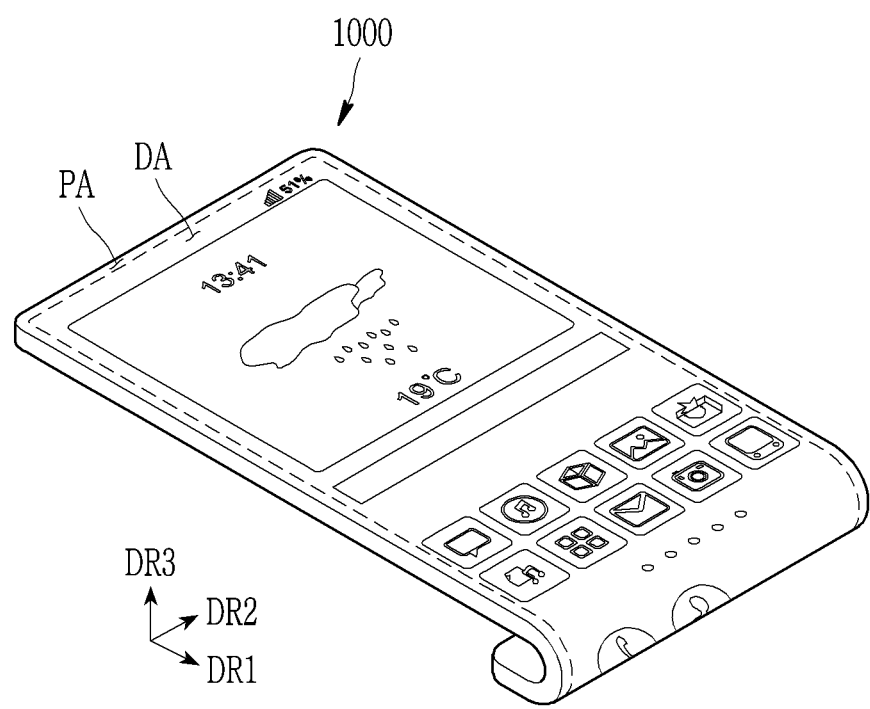
Figure 2G:
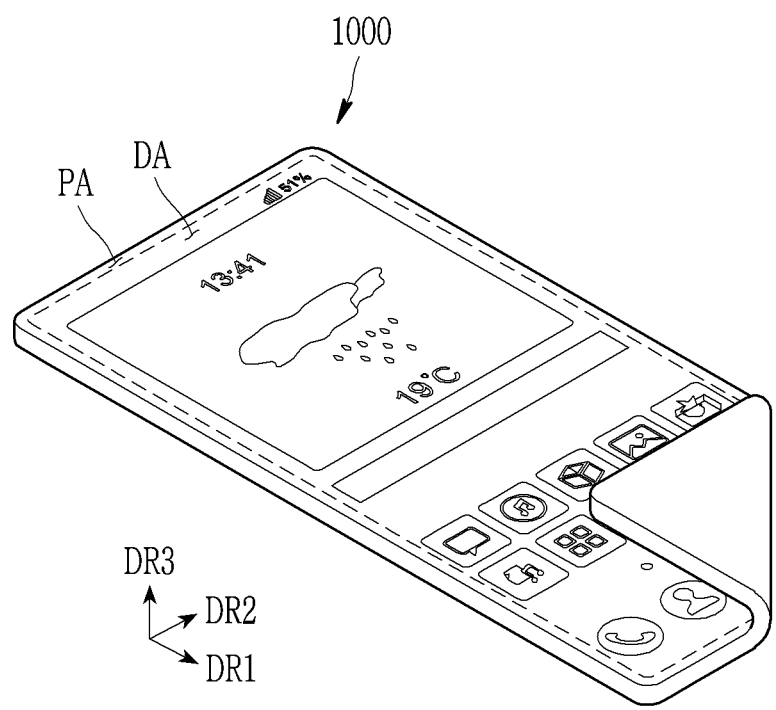

Referring to FIG. 2E to FIG. 2G, the display device 1000 according to the embodiment may be folded or rolled by various methods. As shown in FIG. 2E, the display device 1000 according to the embodiment may be rolled or folded inward from an end portion thereof. As shown in FIG. 2F, the display device 1000 according to the embodiment may be rolled or folded outward from an end portion thereof. As shown in FIG. 2G, the display device 1000 according to the embodiment may be rolled or folded in a diagonal direction. FIG. 2A to FIG. 2G illustrate rolling or folding methods of the display device 1000, but this is not restrictive. The display device 1000 may be folded or rolled by various methods.

Figure 3:
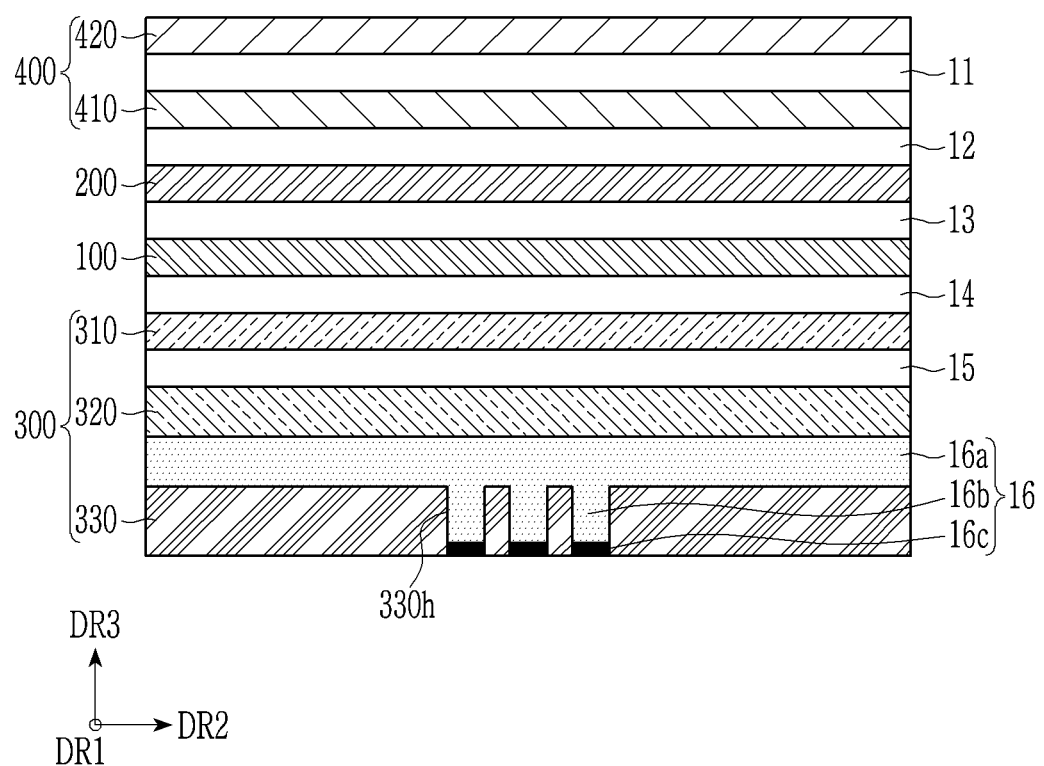
FIG. 3 is a schematic cross-sectional view of a display device according to an embodiment.
Figure 8:
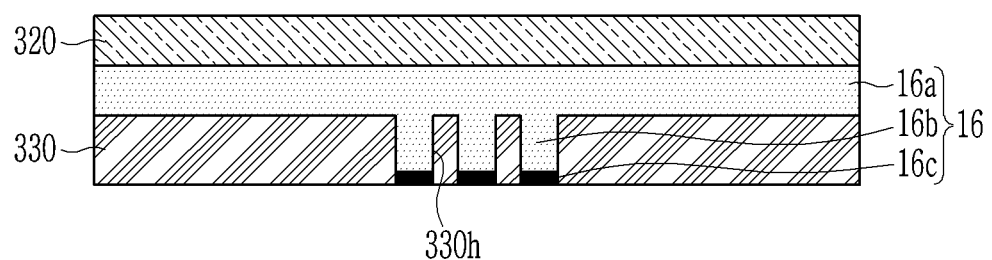
FIG. 8 is a schematic cross-sectional view of the protection layer according to the embodiment.
Figure 9:
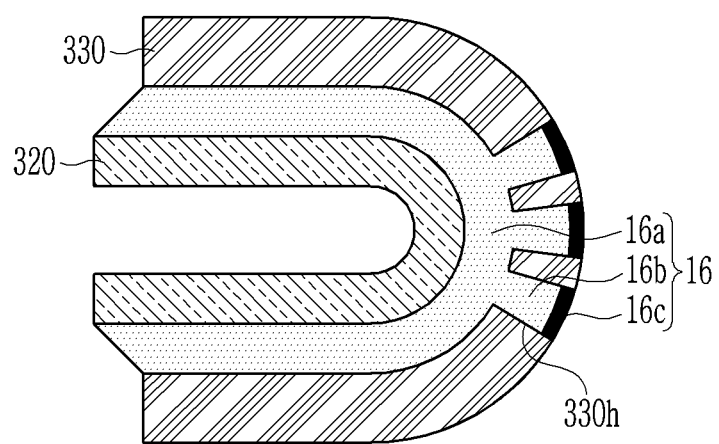
FIG. 9 is a schematic cross-sectional view of an embodiment in which the protection layer is bent.

Hereinafter, referring to FIG. 3 to FIG. 9, a display device according to an embodiment and a protection layer included in the display device will be described. FIG. 3 is a schematic cross-sectional view of a display device according to an embodiment, FIG. 4, FIG. 5, FIG. 6, and FIG. 7 are schematic cross-sectional views of a part of a protection layer during a manufacturing process according to an embodiment, FIG. 8 is a schematic cross-sectional view of the protection layer according to the embodiment, and FIG. 9 is a schematic cross-sectional view of an embodiment in which the protection layer is bent.

Referring to FIG. 3, a display device according to an embodiment will be described.

A display device according to an embodiment includes a display panel 100 including a circuit portion stacked on a substrate, an input sensing member 200 disposed on the display panel 100, a window 400 disposed on the input sensing member 200, and a protection layer 300 disposed on the display panel 100. For example, the protection layer 300 may be disposed on a rear side of the display panel 100.

The display panel 100 may include transistors disposed on a glass substrate or a plastic substrate. The transistors may be electrically connected with a light emitting diode, but this is not restrictive.

The display panel 100 may be an organic light emitting panel, but the type of the display panel 100 is not limited thereto, and may be provided as various panels. For example, the display panel 100 may include a liquid crystal panel, an electrophoretic display panel, an electrowetting display panel, and the like. The display panel 100 may be provided as a next generation display panel such as a micro light emitting diode (micro LED) display panel, a quantum dot light emitting diode (QLED) display panel, a quantum dot organic light emitting diode (QD-OLED) display panel, and the like.

The input sensing member 200 may be disposed on the display panel 100. The input sensing member 200 may sense externally applied touch and generate an electric signal. The touch includes various forms of external input such as body contact/adjacency, contact/adjacency of conductive objects, light, heat, pressure, and the like.

The input sensing member 200 may include various sensors that can sense various inputs, such as a conductive sensor, an optical sensor, a thermal sensor, and the like. The input sensing member 200 may sense a touch applied through a capacitive method or a pressure sensing method.

The input sensing member 200 according to the embodiment may include a structure in which an organic layer, an input sensing electrode, and another organic layer are sequentially stacked, and may include various lamination structures without restriction.

The input sensing member 200 according to the embodiment may be integrally formed on the display panel 100 through a continuous process. The input sensing member 200 may be called an input sensing part or an input sensing circuit.

Although it is not illustrated in the drawings, the input sensing member 200 may further include an optical member disposed between the input sensing member 200 and the display panel 100. The optical member may deteriorate reflectivity of light incident on the front side thereof, or may improve transmittance of light incident on the rear side thereof. The optical member may include at least any one of a polarization film, an anti-reflection film, a retardation film, and an anti-scattering film.

The window 400 may be disposed on the input sensing member 200. The window 400 may protect the display device from an external impact, and provide an input screen to a user. The window 400 may include an external surface exposed to the outside.

The window 400 may include a first layer 410 and a second layer 420. The first layer 410 and the second layer 420 each may include a plastic film including any one selected from a group consisting polyethersulfone (PES), polyacrylate, polyetherimide (PEI), polyethylene naphthalate (PEN), polyethylene terephthalate (PET), polyphenylene sulfide (PPS), polyarylate, polyimide (PI), polycarbonate (PC), and poly(arylene ether sulfone), or a combination thereof. In the embodiments, the first layer 410 or the second layer 420 may be formed of a compound containing acryl (acrylate-based compound), and the acrylate-based compound may be any one selected from a group consisting of poly(methyl methacrylate) (PMMA), urethane acrylate, epoxy acrylate, polyether acrylate, polyester acrylate, acryl acid, 2-ethylhexyl acrylate, 2-methylbutylacrylate, Isooctyl acrylate, lauryl acrylate, ethyl acrylate, butyl acrylate, hexyl acrylate, octyl acrylate, decyl acrylate, isodecyl acrylate, caprolactone acrylate, 1,6-hexanediol diacrylate, trimethylolpropane triacrylate, pentaerythritol triacrylate, silicon acrylate, and combinations thereof.

The display device according to the embodiment may include the protection layer 300 disposed on the display panel 100. For example, the protection layer 300 may be disposed on a rear side of the display panel 100. The protection layer 300 may include a first protection layer 310, a second protection layer 320, and a metal layer 330.

The first protection layer 310 may include a plastic film. For example, the first protection layer 310 may include a plastic film including any one selected from a group consisting of polyethersulfone (PES), polyacrylate, polyetherimide (PEI), polyethylene naphthalate (PEN), polyethylene terephthalate (PET), polyphenylene sulfide (PPS), polyarylate, polyimide (PI), polycarbonate (PC), poly(arylene ether sulfone), and combinations thereof.

A material of the first protection layer 310 may include an organic/inorganic complex material rather than being limited to the above-described plastic resins. The first protection layer 310 may include a porous organic layer, and an inorganic material charged in the pores of the organic layer. The first protection layer 310 may further include a film-function layer provided in the plastic film. The film-function layer may include a resin layer. The film-function layer may be formed through a coating method.

The second protection layer 320 may be a cushion layer according to an embodiment. The second protection layer 320 may absorb a physical impact applied to the display device. Although it is not illustrated in the specification, the second protection layer 320 may include protrusion and depression structures, embossing structures, and the like for impact absorption. The second protection layer 320 is formed as a single layer in the embodiment of the specification, but this is not restrictive. The second protection layer 320 may be formed of multiple layers.

The second protection layer 320 may include any material that can absorb impact. The second protection layer 320 may include a polymer resin, and may include, for example, polyurethane, polycarbonate, polypropylene, polyimide, and polyethylene, or may include a foam that is foamed by molding liquid rubber, a urethane-based material, or an acryl-based material.

The metal layer 330 may be disposed on the display panel 100. For example, the metal layer 330 may be disposed on a rear side of second protection layer 320. The display device may maintain a fixed shape while being foldable or flexible by including the metal layer 330.

The metal layer 330 may include holes 330h according to an embodiment. The holes 330h may overlap the bending axis BX that is parallel with the second direction DR2 along the second direction DR2 as shown in FIG. 2A and FIG. 2B, or may overlap the bending axis BX that is parallel with the first direction DR1 along the first direction DR1 as show in FIG. 2C and FIG. 2D. The hole 330h may have any shape that overlaps a bending axis, but may have, for example, a stripe shape or a lattice shape on a plane.

Adhesive layers 11, 12, 13, 14, 15, and 16 according to the embodiment may be disposed between the first layer 410 and the second layer 420 of the window 400, between the window 400 and the input sensing member 200, between the input sensing member 200 and the display panel 100, between the display panel 100 and the first protection layer 310, between the first protection layer 310 and the second protection layer 320, and between the second protection layer 320 and the metal layer 330, respectively. The adhesive layers 11, 12, 13, 14, 15, and 16 may combine two adjacent layers.

The adhesive layers 11, 12, 13, 14, and 15 may include an optically clear adhesive (OCA), an optically clear resin (OCR), or a pressure sensitive adhesive (PSA). The adhesive layers 11, 12, 13, 14, and 15 may be provided in the form of a film, or may be provided through a printing process.

Hereinafter, the adhesive layer 16 disposed between the second protection layer 320 and the metal layer 330 will be described in detail.

The adhesive layer 16 may include a first area 16a that is disposed between the metal layer 330 and the second protection layer 320, and a second area 16b and a third area 16c that are disposed in the holes 330h of the metal layer 330.

The adhesive layer 16 may have a modulus of about 0.001 MPa to about 0.250 MPa at 25° C. When the adhesive layer 16 satisfies the above-stated modulus range, appropriate flexibility can be provided in the foldable display device. An adhesive material for forming the adhesive layer 16 can be easily filled in the holes 330h included in the metal layer 330.

The adhesive layer 16 may be an acryl-based adhesive, and for example, may include monomers, oligomers, photoinitiators, and other additives (leveling agents, antifoaming agents, and the like).

At least one of monomers and oligomers may include at least one of 2-ethylhexyl acrylate (2-EHA), 2-hydroxyethyl acrylate (2-HEA), isobornyl acrylate (IBoA), isobornyl methacrylate, isooctyl acrylate (IOA), n-octyl acrylate, n-butyl acrylate (n-BA), vinyl acetate (VAC), cyclohexyl acrylate (CHA), tetrahydrofurfuryl acrylate (THFA), 4-acryloylmorpholine, lauryl acrylate, and urethane acrylate.

The acryl-based adhesive according to the embodiment may include 40 to 80 wt % of monomers, 0 to 30 wt % of oligomers, 2 to 8 wt % of photoinitiators, 0.2 to 50 wt % of other additives, and 15 to 50 wt % of first and second materials.

The first area 16a and the second area 16b may include a same material, and the third area 16c may include a material that is modified from the material included in the first and second areas 16a and 16b into a shape due to heat and light.

The first area 16a and the second area 16b may independently include at least one of poly(isobornyl acrylate) (PiBoA) and poly(tert-butyl acrylate) (PtBA), which are first materials. The first area 16a and the second area 16b may independently further include a photoacid generator (PAG), which is a second material, and the photoacid generator may include at least one of N-trifluoromethylsulfonyloxy-1,8-naphthalimide and bis(cyclohexyl sulfonyl)diazomethane. The photoacid generator may assist in the decomposition of complexes into materials that generate acids by light.

The third area 16c may contain compounds after application of light and heat to the first material using the photoacid generator as a catalyst. For example, the first area 16a and the second area 16b independently include at least one of PiBoA and PtBA, while the third area 16c may include polyacrylic acid (PAA) and camphene or polyacrylic acid (PAA) and isobutene. In case that the first area 16a and the second area 16b include PiBoA according to Chemical Formula 1, the photoacid generator, which is the second material, may be N-trifluoromethylsulfonyloxy-1,8-naphthalimide, and the third area 16c may include polyacrylic acid (PAA) and camphene. In case that the first area 16a and the second area 16b include PtBA (poly(tert-butyl acrylate)) according to Chemical Formula 2, the photoacid generator, which is the second material, may include bis(cyclohexyl sulfonyl)diazomethane and the third area 16c may include polyacrylic acid (PAA) and isobutene.

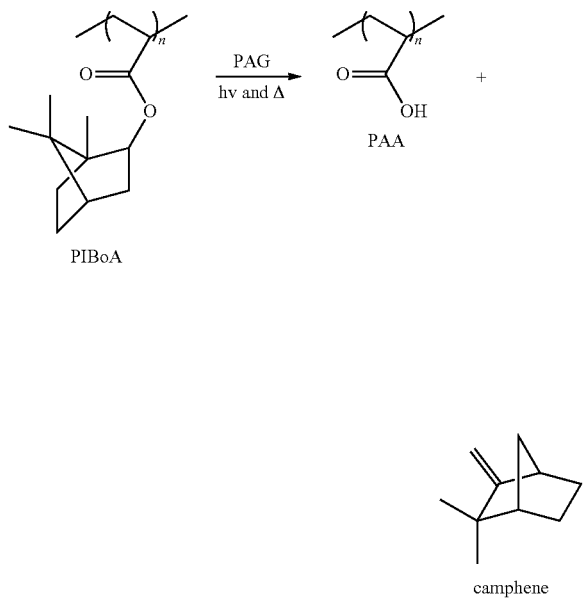

-continued

[Chemical Formula 2]

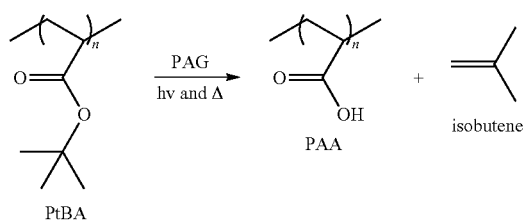

In Chemical Formula 1 and Chemical Formula 2, n is a natural number of 1 or more.

Peeling strength of the adhesive material included in the first area 16a and the second area 16b and peeling strength of the adhesive material included in the third area 16c may be different from each other. Peeling strength of the adhesive material included in the first area 16a and the second area 16b may be greater than peeling strength of the adhesive material included in the third area 16c. The peeling strength of the adhesive material included in the third area 16c may be equal to or substantially close to zero so that the third area 16c hardly provides peeling strength.

Hereinafter, referring to FIG. 4 to FIG. 7, a method for manufacturing the protection layer 300 where the second protection layer 320, the adhesive layer 16, and the metal layer 330 are stacked according to an embodiment will be described.

Figure 4:
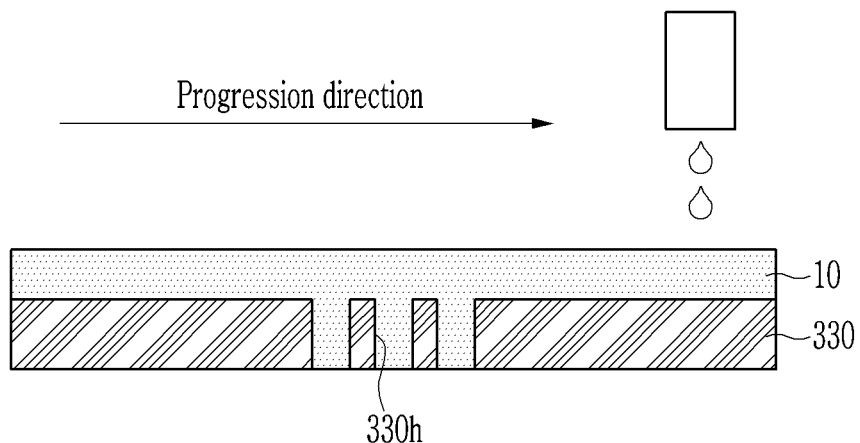
FIG. 4, FIG. 5, FIG. 6, and FIG. 7 are schematic cross-sectional views of a part of a protection layer during a manufacturing process according to an embodiment.

As shown in FIG. 4, the adhesive material is applied to the metal layer 330 including the holes 330h. The adhesive material 10 may be provided not only on the top surface of the metal layer 330 but also inside the holes 330h.

The adhesive material 10 may be a material for forming the adhesive layer 16 described with reference to FIG. 3. The adhesive material 10 may include an acryl-based adhesive material, and for example, may include monomers, oligomers, photoinitiators, and other additives (leveling agents, antifoaming agents, and the like).

At least one of monomers and oligomers may include at least one of 2-ethylhexyl acrylate (2-EHA), 2-hydroxyethyl acrylate (2-HEA), isobornyl acrylate (IBoA), isobornyl methacrylate, isooctyl acrylate (IOA), n-octyl acrylate, n-butyl acrylate (n-BA), vinyl acetate (VAC), cyclohexyl acrylate (CHA), tetrahydrofurfuryl acrylate (THFA), 4-acryloylmorpholine, lauryl acrylate, and urethane acrylate.

The acryl-based adhesive according to the embodiment may include 40 to 80 wt % of monomers, 0 to 30 wt % of oligomers, 2 to 8 wt % of photoinitiators, 0.2 to 50 wt % of other additives, and 15 to 50 wt % of a first material and a second material.

The first material may include, for example, at least one of poly(isobornyl acrylate) (PiBoA) and poly(tert-butyl acrylate) (PtBA). A photoacid generator, which is the second material, may include at least one of N-trifluoromethylsulfonyloxy-1,8-naphthalimide and bis(cyclohexyl sulfonyl)diazomethane.

Figure 5:
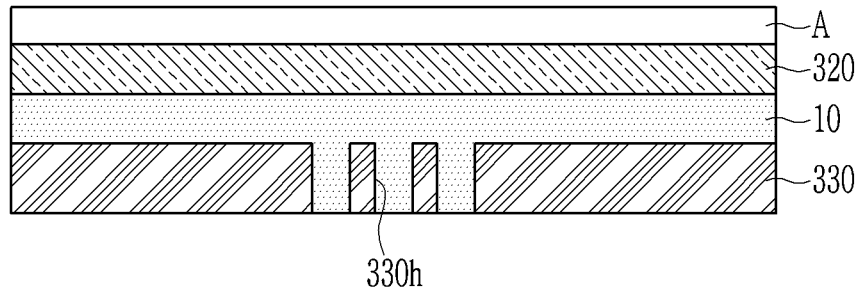

As shown in FIG. 5, the second protection layer 320, disposed on an auxiliary substrate A, is disposed on the adhesive material 10. The adhesive material 10 may be disposed between a side of the second protection layer 320 and a side of the metal layer 330. Although it is not illustrated in the specification, after stacking the second protection layer 320, a light irradiation process can be carried out with respect to the adhesive material 10. The irradiated light may have a wavelength of about 300 nanometers or more.

Figure 6:
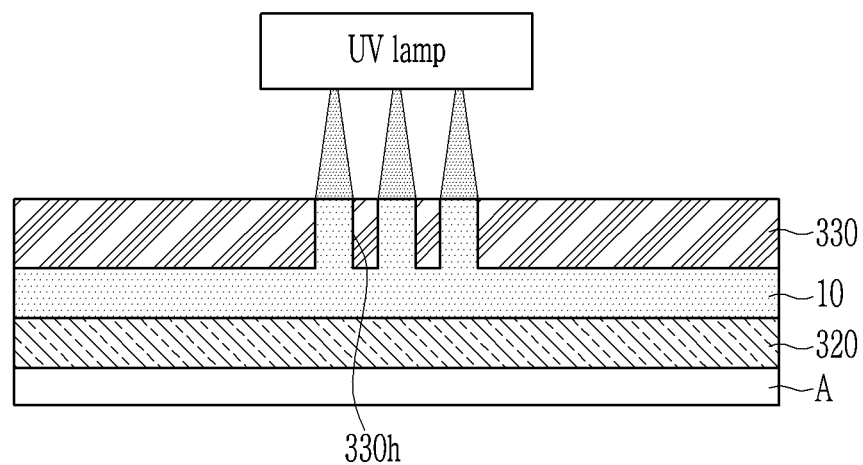

As shown in FIG. 6, light irradiation is carried out with respect to the adhesive material 10 exposed by the holes 330h of the metal layer 330. The wavelength of the irradiated light may be less than about 300 nanometers.

Figure 7:
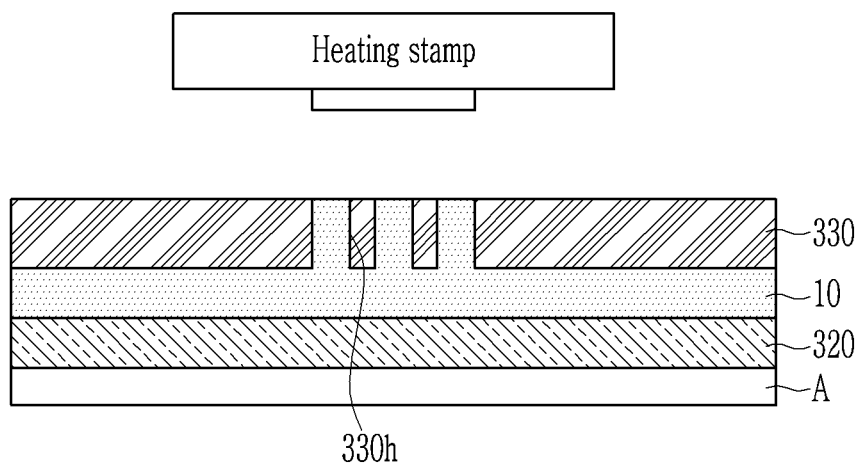

As shown in FIG. 7, a heating process is carried out on the adhesive material 10 where the light is irradiated. The heating process may be carried out by using, for example, a heating stamp, and the heating stamp may perform the heating process only on the adhesive material 10 exposed by the holes 330h.

When the light irradiation process of FIG. 6 and the heating process of FIG. 7 are carried out, as shown in FIG. 8, the first area 16a, the second area 16b, and the third area 16c may be formed. The adhesive material 10 that does not involve a material change during the light irradiation process and the heating process may form the first area 16a and the second area 16b, and some of the adhesive material 10 that does involve a material change during the light irradiation process may form the third area 16c. The third area 16c may have peeling strength that is equal to or substantially close to zero. The protection layer shown in FIG. 8 may be partially folded and thus may have a shape shown in FIG. 9.

Figure 10:
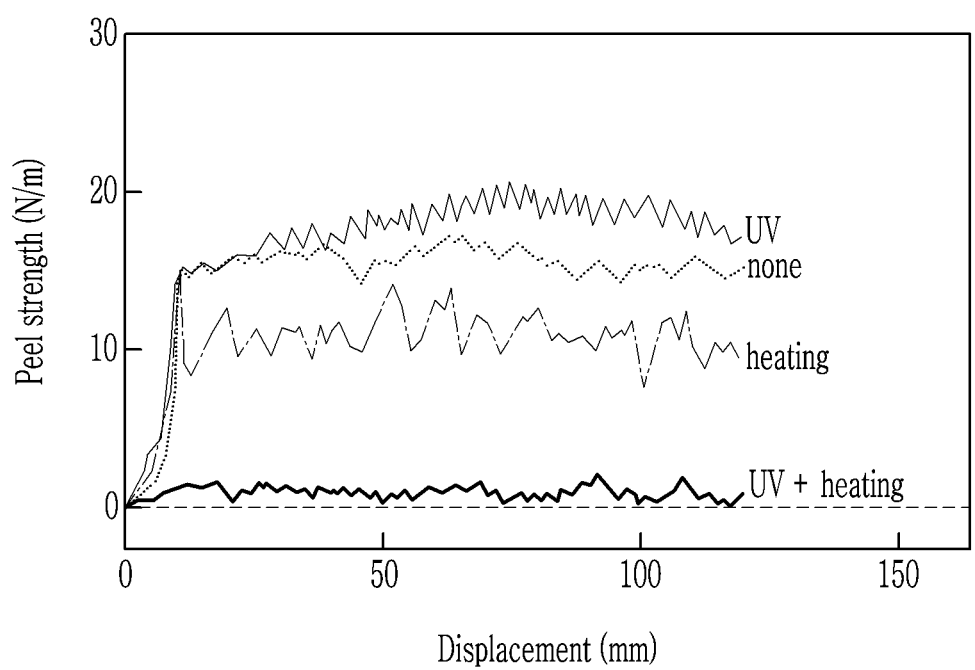
FIG. 10 is a graph that shows peeling strength of an adhesive material according to a manufacturing process.

Hereinafter, an adhesive layer according to an embodiment will be described with reference to FIG. 10. FIG. 10 is a graph that shows peeling strength of an adhesive material according to a manufacturing process.

Referring to FIG. 10, it can be observed through the graph that an adhesive material according to an embodiment maintains peeling strength even when only a UV light irradiation process is performed or when only a heating process is performed. However, when the UV light irradiation process and the heating process are both performed with respect to the adhesive material, the peeling strength may be equal to or substantially close to zero, which means that the peeling strength is eliminated. As described above, the peeling strength of the adhesive material may be equal to or substantially close to zero in an area where the light irradiation process and the heating process are performed according to the embodiment.

According to this, the adhesive material positioned between the protection layer and the metal layer maintains the peeling strength while maintaining the bonding of the protection layer and the metal layer, and the adhesive material exposed by the hole of the metal layer can prevent permeation of external foreign particles while not maintaining peeling strength.

The display device according to the embodiment includes a simple structure of a protection layer and a metal layer to simplify a stacking structure of the device and to provide flexibility to the device. Simplifying the stacked structure simplifies the manufacturing process and reduces the cost and time required for the manufacturing process. Since the permeation of external foreign particles can be prevented through the adhesive material filling the holes of the metal layer, the reliability of the device can be improved.

While this invention has been described in connection with what is considered to be practical embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

1000: display device
300: protection layer
310: first protection layer

320: second protection layer
330: metal layer
11, 12, 13, 14, 15, 16: adhesive layer
16a: first area
16b: second area
16c: third area
100: display panel
200: input sensing member
400: window

What is claimed is:

1. A display device comprising:
a display panel; and
a protection layer disposed on the display panel, the protection layer comprising:
a first protection layer;
a metal layer that overlaps the first protection layer and includes a hole; and
an adhesive layer disposed between the first protection layer and the metal layer, the adhesive layer comprising:
a first area disposed between the first protection layer and the metal layer; and
a second area and a third area that are disposed in the hole, wherein a peeling strength of the second area and a peeling strength of third area are different from each other,
wherein
the peeling strength of the third area is about zero.

2. The display device of claim 1, wherein the peeling strength of the second area is greater than the peeling strength of the third area.

3. The display device of claim 1, further comprising a second protection layer disposed between the first protection layer and the metal layer.

4. The display device of claim 1, wherein the adhesive layer comprises an acryl-based adhesive material.

5. The display device of claim 4, wherein the acryl-based adhesive material comprises at least one of 2-ethylhexyl acrylate (2-EHA), 2-hydroxyethyl acrylate (2-HEA), isobornyl acrylate (IBoA), isobornyl methacrylate, isooctyl acrylate (IOA), n-octyl acrylate, n-butyl acrylate (n-BA), vinyl acetate (VAC), cyclohexyl acrylate (CHA), tetrahydrofurfuryl acrylate (THFA), 4-acryloylmorpholine, lauryl acrylate, and urethane acrylate.

6. The display device of claim 1, wherein the adhesive layer has a modulus of about 0.001 MPa to about 0.250 MPa at 25° C.

7. The display device of claim 1, wherein the first area and the second area independently comprise at least one of poly(isobornyl acrylate) (PiBoA) and poly(tert-butyl acrylate) (PtBA).

8. The display device of claim 7, wherein the first area and second area independently further comprise a photoacid generator.

9. The display device of claim 8, wherein the photoacid generator comprises at least one of N-trifluoromethylsulfonyloxy-1,8-naphthalimide and bis(cyclohexyl sulfonyl)diazomethane.

10. The display device of claim 7, wherein the third area further comprises at least one of camphene and isobutene.

11. A display device comprising:
a display panel; and
a protection layer disposed on the display panel, the protection layer comprising:
a first protection layer;
a second protection layer disposed on the first protection layer;
a metal layer disposed on the second protection layer and includes a plurality of holes; and
an adhesive layer disposed between the second protection layer and the metal layer, the adhesive layer comprising:
a first area disposed between the first protection layer and the metal layer; and
a second area and a third area that are disposed in the plurality of holes, wherein
a peeling strength of the second area and a peeling strength of third area are different from each other,
a bending axis of the display device overlaps the plurality of holes, and
the third area further comprises at least one of camphene and isobutane.

12. The display device of claim 11, wherein the peeling strength of the second area is greater than the peeling strength of the third area.

13. The display device of claim 11, wherein the adhesive layer comprises an acryl-based adhesive material.

14. The display device of claim 13, wherein the acryl-based adhesive material comprises at least one of 2-ethylhexyl acrylate (2-EHA), 2-hydroxyethyl acrylate (2-HEA), isobornyl acrylate (IBoA), isobornyl methacrylate, isooctyl acrylate (IOA), n-octyl acrylate, n-butyl acrylate (n-BA), vinyl acetate (VAC), cyclohexyl acrylate (CHA), tetrahydrofurfuryl acrylate (THFA), 4-acryloylmorpholine, lauryl acrylate, and urethane acrylate.

15. The display device of claim 11, wherein the adhesive layer has a modulus of about 0.001 MPa to about 0.250 MPa at 25° C.

16. The display device of claim 11, wherein the first area and the second area independently comprise at least one of poly(isobornyl acrylate) (PiBoA) and poly(tert-butyl acrylate) (PtBA).

17. The display device of claim 16, wherein the first area and the second area independently further comprise at least one of N-trifluoromethylsulfonyloxy-1,8-naphthalimide and bis(cyclohexyl sulfonyl)diazomethane.

* * * * *